(12) United States Patent
Hinojosa et al.

(10) Patent No.: US 8,321,461 B2
(45) Date of Patent: Nov. 27, 2012

(54) UPGRADING ROLES IN A ROLE-BASED ACCESS-BASED CONTROL MODEL

(75) Inventors: Jose Alberto Lozano Hinojosa, Redmond, WA (US); Vladimir V. Grebenik, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 412 days.

(21) Appl. No.: 12/789,520

(22) Filed: May 28, 2010

(65) Prior Publication Data

US 2011/0296414 A1   Dec. 1, 2011

(51) Int. Cl.
*G06F 7/00* (2006.01)
(52) U.S. Cl. ...................................... 707/784
(58) Field of Classification Search .......... 707/784, 707/781
See application file for complete search history.

(56) References Cited

U.S. PATENT DOCUMENTS

| | | | |
|---|---|---|---|
| 7,305,547 B2 | 12/2007 | Musa | |
| 7,650,633 B2 | 1/2010 | Whitson | |
| 7,669,244 B2 | 2/2010 | Smith | |
| 2006/0218394 A1 | 9/2006 | Yang | |
| 2008/0162930 A1 | 7/2008 | Finney | |
| 2008/0168063 A1* | 7/2008 | Whitson | 707/9 |
| 2008/0184336 A1 | 7/2008 | Sarukkai | |
| 2008/0244687 A1* | 10/2008 | McClain et al. | 726/1 |
| 2008/0270408 A1* | 10/2008 | Ratnala | 707/9 |
| 2008/0307505 A1* | 12/2008 | Persaud-Deolall et al. | 726/4 |

OTHER PUBLICATIONS

Observations on the Role Life-Cycle in the Context of Enterprise Security Management—Published Date: 2002 http://www.google.com/url?sa=t&source=web&ct=res&cd=10&ved=0CCkOFjAJ&url=http%3A%2F%2Fciteseerx.ist.psu.edu%2Fviewdoc%2Fdownload%3Fdoi%3D10.1.1.96.4670%26rep%3Drep1%26type%3Dpdf&ei=pVqnS4OjBYKUjAeHvv21AO&usg=AFOjCNGgTbiPPY6Dm4fkdgZ31KFcGtDbMA, pp. 1-9.

Ludwig, Fuchs et al.: "Automating Periodic Role-Checks a Tool-Based Approach"—Published Date: 2009 http://epub.uni-regensburg.de/6513/1/Automating_periodic_role-checks.pdf, pp. 1-10.

Gansen Zhao et al.: "Obligations for Role Based Access Control"—Published Date: 2007 http://ieeexplore.ieee.org/stamp/stmp.jsp?tp=&arnumber=4221096 , pp. 1-8.

Omada Role Engine—Retrieved Date: Mar. 23, 2010 http://www.omada.net/Role-Engine—RBAC-144.aspx , pp. 1-2.

RBAC/Single Sign-On—Retrieved Date: Mar. 23, 2010 http://www.pcs-ag.com/Biotech-Automation/Role-Based-Access-Control_en.html , pp. 1-2.

\* cited by examiner

*Primary Examiner* — Neveen Abel Jalil
*Assistant Examiner* — Tyler Torgrimson
(74) *Attorney, Agent, or Firm* — Merchant & Gould

(57) ABSTRACT

Management roles in a role-based framework may be upgraded by updating existing management roles, updating derived roles, and deprecating or reducing existing and derived roles in the role-based framework. The existing management roles may include a set of existing role entries for defining an action using parameters, scripts, application program interface calls, and a special permission for enabling performance of tasks defined by the management roles. The derived roles may include custom management roles derived from the existing management roles in the role-based framework.

17 Claims, 7 Drawing Sheets

UPGRADING ROLES IN A ROLE-BASED ACCESS-BASED CONTROL MODEL

CROSS-REFERENCE TO RELATED APPLICATIONS

The present application is related to U.S. patent application Ser. No. 12/485,945, entitled "Role-Based Security For Messaging Administration and Management," filed on Jun. 17, 2009, U.S. patent application Ser. No. 12/475,612, entitled "Extensible Role-Based Access Control Model For Services," filed on Jun. 1, 2009, U.S. patent application Ser. No. 12/488,604, entitled "Scope Model For RBAC Administration," filed on Jun. 22, 2009, U.S. patent application Ser. No. 12/485,954, entitled "Exclusive Scope Model For RBAC Administration," filed on Jun. 17, 2009, and U.S. patent application Ser. No. 12/476,286, entitled "Delegation Model For Role-Based Access Control Administration," filed on Jun. 2, 2009. All of the above-referenced applications are assigned to the same assignee as the present application and are expressly incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The management of complex services associated with enterprise messaging can be difficult. For example, there are multiple users/administrators that need to have different levels of access. Assigning these permissions with sufficient granularity over a multitude of heterogeneous resources (e.g., files, email items, objects in directory, etc.) is a challenging task because the assignment depends on the what user needs to perform the associated business function, as well as implementation details of what these business functions need to touch in order to perform desired action. These implementation details can change over time. For example, creating a new mailbox requires permissions to create a new user account, modify several properties, and access to a particular mailbox database. Additionally, the auditing of resources-level permissions is difficult because the permissions are spread all over directory, file system, mailboxes, etc. Even if there was a way to accurately obtain all ACLs (access control lists) relevant to a particular user, it would still be challenging to explain why a particular permission is needed (e.g., which business function requires the permission). Moreover, with multiple administrators touching permissions it is easy to misconfigure ACLs. A relatively recent technology, a role-based access control (RBAC) model, employs fixed sets of roles that relate to job functions. RBAC works by assigning fixed permissions to all resources needed by a user to perform actions related to the role. However, it is common for subsequent (i.e., upgraded) versions of a product that uses RBAC to change the meanings of existing roles. Thus, a role in upgraded version X+1 of an RBAC product may contain more or fewer permissions than in an existing version X, and thus not be the same between versions. For example, in version X+1, it may be desirable to remove certain permissions from an existing role because they no longer fit the new definition of the role (or there was a problem with the original role definition). Even more common may be the scenario where new actions need to be added to the existing roles. Furthermore, management roles may need to be deprecated (i.e., deleted) once they are no longer useful or simply split into several additional roles when the meaning of a single management role defined in version X is too broad. Moreover, due to the nature of parameterized actions (such as cmdlets) some parameters may get renamed, removed, added, or simply just moved from one management role to another. As a result, users of an RBAC product may be affected by the aforementioned changes when the upgraded version is deployed. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for upgrading management roles in a role-based framework by updating existing management roles, updating derived roles, and deprecating or reducing existing and derived roles in the role-based framework. The existing management roles may include a set of existing role entries for defining an action using parameters, scripts, application program interface calls, and a special permission for enabling performance of tasks defined by the management roles. The derived roles may include custom management roles derived from the existing management roles in the role-based framework.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for upgrading management roles in a role-based framework by updating existing management roles, updating derived roles, and deprecating or reducing existing and derived roles in the role-based framework. The existing management roles may include a set of existing role entries for defining an action using parameters, scripts, application program interface calls, and a special permission for enabling performance of tasks defined by the management roles. The derived roles may include custom management roles derived from the existing management roles in the role-based framework.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
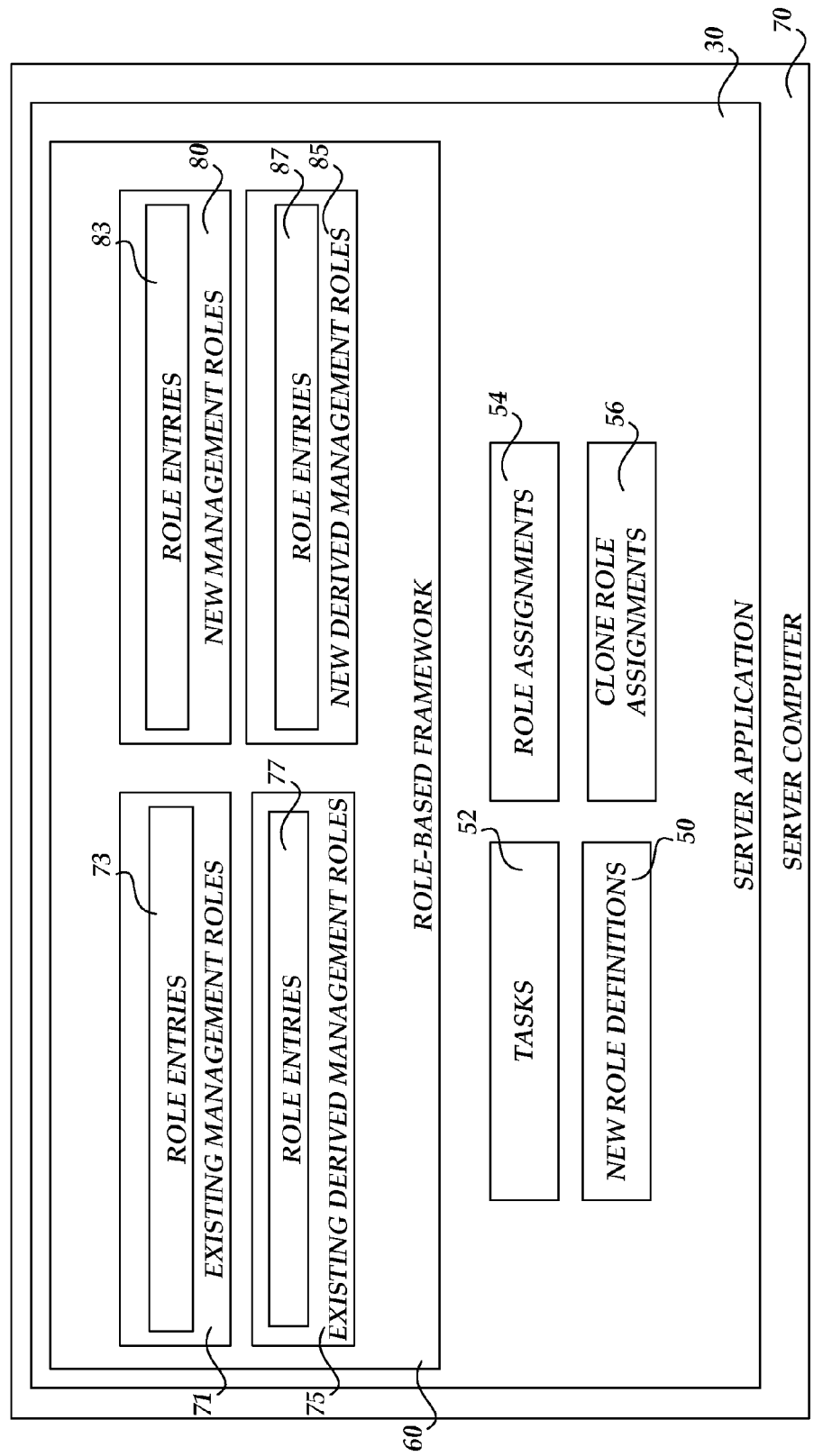
FIG. 1 is a block diagram illustrating a network architecture for upgrading management roles in a role-based framework, in accordance with various embodiments.

Referring now to the drawings, in which like numerals represent like elements through the several figures, various aspects of the present invention will be described. FIG. 1 is a block diagram illustrating a network architecture which may be utilized for upgrading management roles in a role-based framework, in accordance with various embodiments. The network architecture includes a server computer 70 which includes a server application 30. In accordance with an embodiment, the server application 30 may comprise the EXCHANGE SERVER collaborative application product from MICROSOFT CORPORATION of Redmond, Wash. which incorporates a role-based access control (RBAC) model. It should be understood that the embodiments described herein should not be construed as being limited to the aforementioned software application and that other software applications from other developers and/or manufacturers may also be utilized. It should be understood that the RBAC model in the server application 30 may comprise an RBAC authorization model which is utilized in large complex systems (such as messaging systems). For example, the RBAC authorization model may be utilized for the administration of a messaging infrastructure that includes electronic mail accounts and mailbox resources. In accordance with an embodiment, the RBAC authorization model may utilize the following concepts:

Management role: A management role is a container for a set of management role entries. Roles are used to define the specific tasks that can be performed by security principals that the role is assigned to. It should be understood that the RBAC model described herein may treat management roles in a hierarchical way and that there may be a fixed number of "canned" management roles that contain all of a possible number of permissions. In accordance with an embodiment, canned management roles are immutable (i.e., they may not be modified) and they may be updated only during a setup or upgrade of the RBAC model. It will be appreciated, however, that custom (i.e., derived) management roles may be created from canned management roles. It should further be noted however, that these custom (or derived) roles may not contain more than the parent role (i.e., the canned management role). An example of a management role is an electronic mail distribution group administrator in a messaging system. Example permissions associated with electronic mail distribution group administration may include enabling distribution groups, creating distribution groups, assigning members to the distribution group, and naming the distribution group.

Management role entry: A management role entry defines an action with the specific parameters (e.g., cmdlet parameters), script, application program interface (API) calls or a special permission that enables each specific task in a role to be performed. For example, a cmdlet may be utilized to create a new distribution group.

Role group: A role group is a security group that contains a list of security principals that are assigned a specific role or scope. Typically management roles are assigned to role groups.

Management role assignment: A management role assignment links a role and a role group. A management role assignment may also link a role and another security principal, such as a user. Assigning a role to a role group grants members of the role group the ability to use the cmdlets and parameters defined in the role. Role assignments can use management scopes to control where the assignment can be used.

Management scope: A management scope is the scope of influence or impact on a role assignment. When a role is assigned with a scope to a role group, the management scope targets specifically what objects that assignment is allowed to manage. The assignment, and its scope, are then given to the members of the role group, and restrict what those members can manage. Scopes may be defined as lists of servers, organization units (OUs), or arbitrary filters. For example, a management scope may restrict a management role for administering an electronic mail distribution group to a particular region (e.g., the United States but not Europe) and further filter the management role by a particular department in an organization. For example, a role for administering an electronic mail distribution group may be restricted to only the financial department servers in an organization.

The server application 30 may include a role-based framework 60, new role definitions 50, tasks 52, role assignments 54, and clone role assignments 56. The role-based framework 60 may include existing management roles 71, existing derived management roles 75, new management roles 80, and new derived management roles 87. The existing management roles 71 may include role entries 73, the existing derived management roles 75 may include role entries 77, the new management roles 80 may include role entries 83, and the new derived management roles 85 may include role entries 87. Illustrative contents of the role entries (i.e., the role entries 73) will be described in greater detail below with respect to FIG. 2. In accordance with an embodiment, the existing management roles 71 may comprise canned top level management roles which contain role entries (i.e., the role entries 73) defined using an older version (e.g., version X) of the server application 30. The existing derived management roles 75 may comprise derived or custom top level management roles which contain role entries (i.e., the role entries 77) defined using an older version (e.g., version X) of the server application 30. Additionally, the new management roles 80 and the new derived management roles 85 may contain updated versions of the role entries 73 and 77 contained in the existing management roles 71 and the derived management roles 75. These updated role entries (i.e., the role entries 83 and 87) may be defined using a newer version (e.g., version X+1) of the server application 30.

The server application 30 may further include new role definitions 50, tasks 52, role assignments 54, and clone role assignments 56. In accordance with various embodiments, the new role definitions 50 may comprise new definitions for the new management roles 80 and/or the new derived management roles 85. The tasks 52 may comprise specific tasks performed by a management role (i.e., any of the management roles 71, 75, 80, or 85). The role assignments 54 may comprise various management role assignments for the management roles 71, 75, 80, and 85 which, as discussed above, link a role to a role group. The clone role assignments 56 may comprise a role assignment which is created when deprecating (i.e., deleting) and/or reducing a management role. As will be discussed in greater detail below with respect to FIG. 7, for role assignments associated with existing management or derived roles (i.e., old roles), the server application 30 may be configured to create a clone role assignment that points to a new matched set of roles which respects an original management scope.

Figure 2:
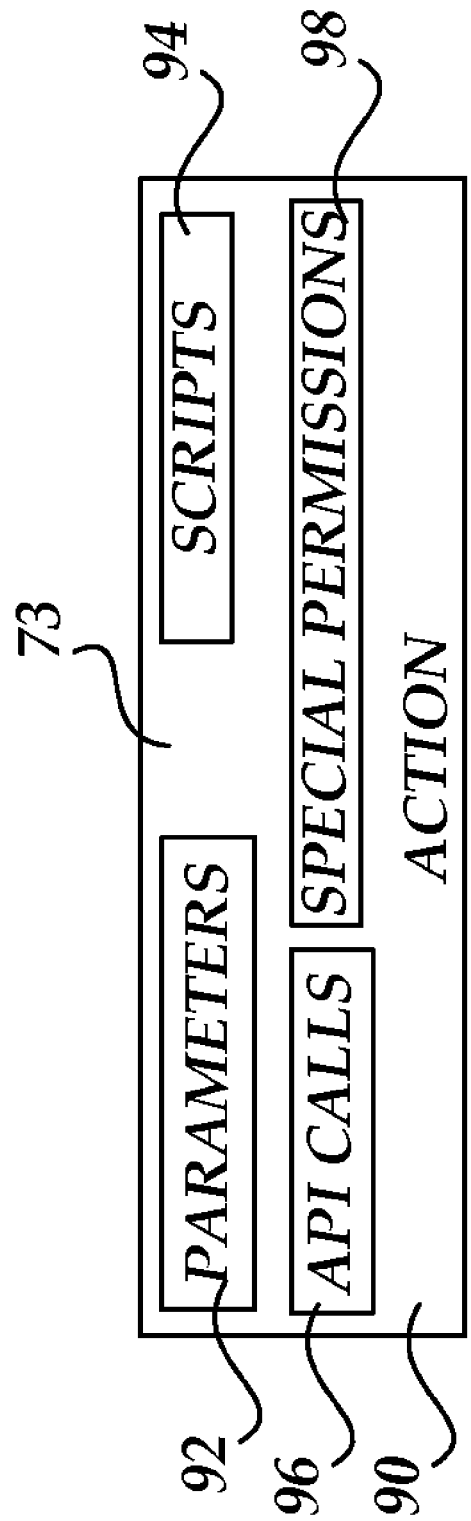
FIG. 2 is a block diagram illustrating the contents of a role entry for an existing management role in the role-based framework shown in FIG. 1, in accordance with various embodiments.

FIG. 2 is a block diagram illustrating the contents of role entry for an existing management role in the role-based framework shown in FIG. 1, in accordance with various embodiments. While FIG. 2 illustrates the contents of a role entry 73 in the existing management roles 71 of FIG. 1, it should be appreciated that the following description may also be applicable to the role entries 77, 83, and 87 contained in the existing derived management roles 77, the new management roles 80, and the new derived management roles 85, respectively. The role entry 73 may include an action 90. The action 90 may defined by the role entry 73 with specific parameters 92, scripts 94, API calls 96, and one or more special permissions 98 which enable each specific task in a management role to be performed. For example, the server application 30 may utilize the action 90 to create a new electronic mail distribution group or to assign a new mailbox in the distribution group.

Exemplary Operating Environment

Figure 3:
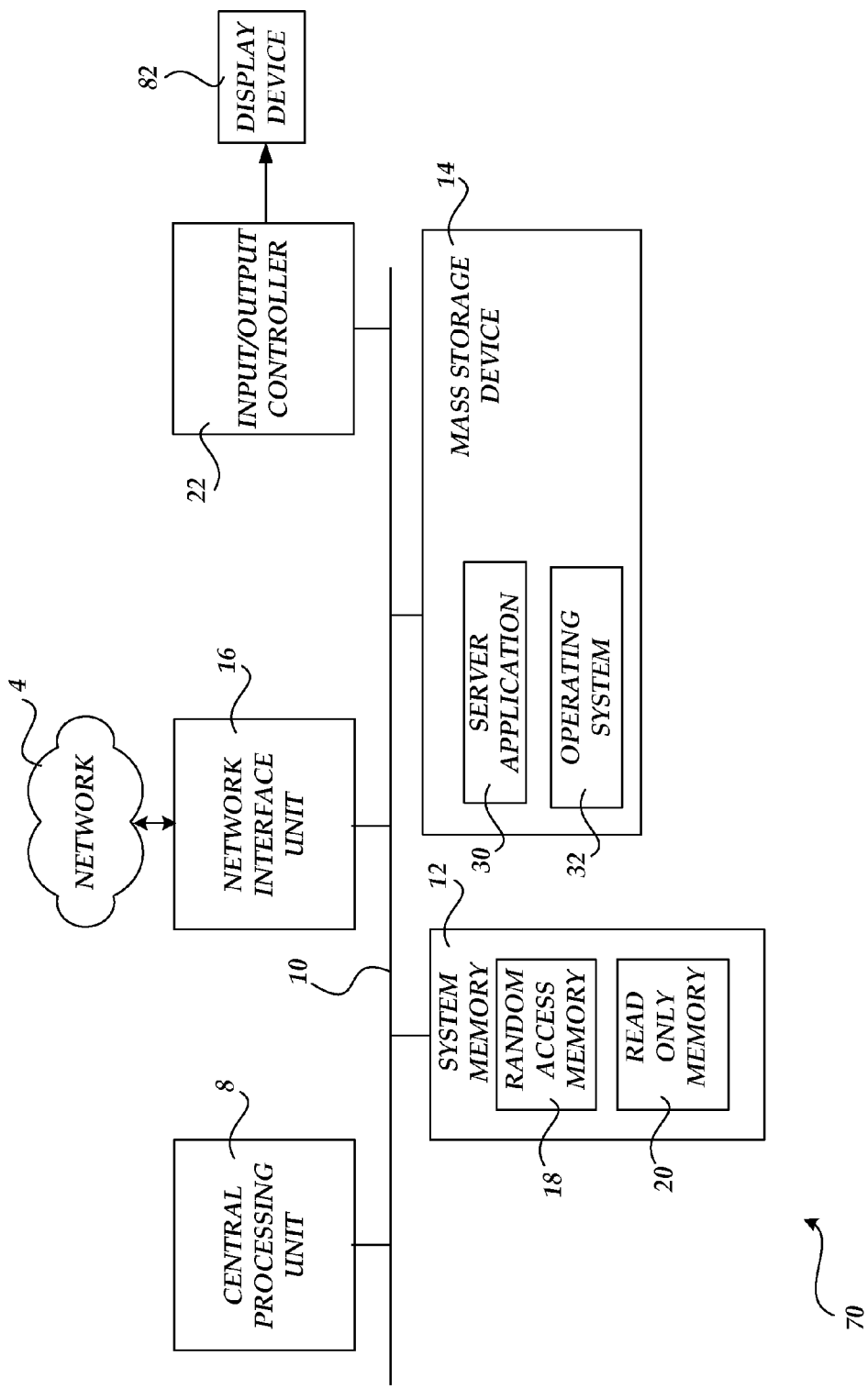
FIG. 3 is a block diagram illustrating a client computing environment for upgrading management roles in a role-based framework, in accordance with various embodiments.

Referring now to FIG. 3, the following discussion is intended to provide a brief, general description of a suitable computing environment in which various illustrative embodiments may be implemented. While various embodiments will be described in the general context of program modules that execute in conjunction with program modules that run on an operating system on a computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 3 shows the server computer 70 which may comprise any type of computer capable of executing one or more application programs. The server computer 70 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The server computer 70 may further include a mass storage device 14 for storing the server application 30 and an operating system 32. In accordance with various embodiments, the operating system 32 may be suitable for controlling the operation of a networked computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the server computer 70. Although the description of computer-readable media contained herein refers to a mass storage device, such as a hard disk or CD-ROM drive, it should be appreciated by those skilled in the art that computer-readable media can be any available media that can be accessed or utilized by the server computer 70. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the server computer 70.

Communication media includes any information delivery media. For example, in accordance with an embodiment, communication media may include a wired network or direct-wired connection. In accordance with another embodiment, communication media may include wireless media such as acoustic, RF, infrared, and other wireless media. In accordance with yet another embodiment, communication media may include computer-readable instructions, data structures, program modules or other data in a modulated data signal such as a carrier wave or other transport mechanism. The term "modulated data signal" means a signal that has one or more of its characteristics set or changed in such a manner as to encode information in the signal. Combinations of any of the above should also be included within the scope of computer-readable media. Computer-readable media may also be referred to as a computer program product.

According to various embodiments, the server computer 70 may operate in a networked environment using logical connections to remote computers through a network 4 which may comprise, for example, a local network or a wide area network (e.g., the Internet). The server computer 70 may connect to the network 4 through a network interface unit 16 connected to the bus 10. It should be appreciated that the network interface unit 16 may also be utilized to connect to other types of networks and remote computing systems. The server computer 70 may also include an input/output controller 22 for receiving and processing input from a number of input types, including a keyboard, mouse, pen, stylus, finger, voice input, and/or other means. Similarly, an input/output controller 22 may provide output to a display device 82, a printer, or other type of output device. Additionally, a touch screen can serve as an input and an output mechanism.

Figure 4:
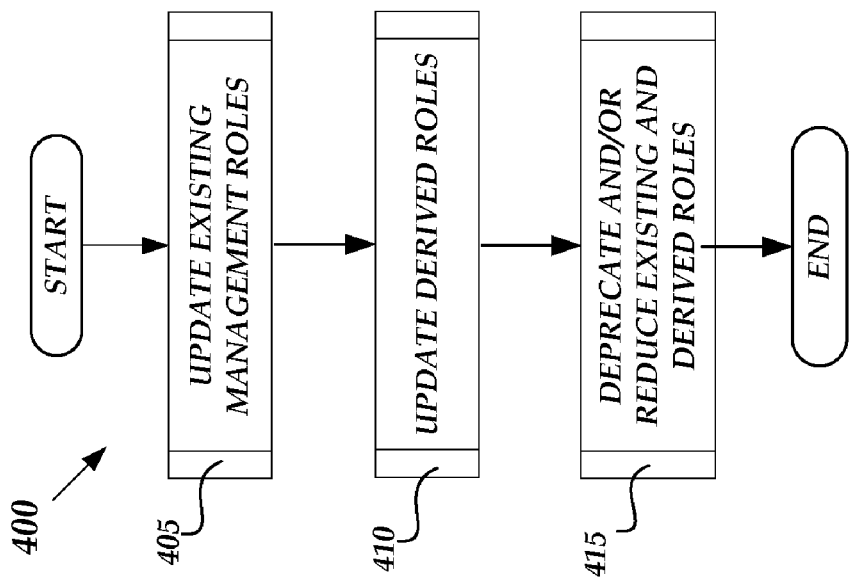
FIG. 4 is a flow diagram illustrating a routine for upgrading management roles in a role-based framework, in accordance with various embodiments.

FIG. 4 is a flow diagram illustrating a routine 400 for upgrading management roles in a role-based framework, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 4-7 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 400 begins at operation 405, where the server application 30 executing on the server computer 70 updates the existing management roles 71 in the role-based framework 60. In accordance with an embodiment, updated management roles may also include the creation of new management roles in the role-based framework 60. Logical operations performed by the server application 30 for updating the existing management roles 71 will be described in greater detail below with respect to FIG. 5.

From operation 405, the routine 400 continues to operation 410 where the server application 30 executing on the server computer 70 updates the existing derived management roles 75 in the role-based framework 60. Logical operations performed by the server application 30 for updating the existing derived management roles 75 will be described in greater detail below with respect to FIG. 6.

From operation 410, the routine 400 continues to operation 415 where the server application 30 executing on the server computer 70 deprecates (i.e., deletes) and/or reduces the existing and derived management roles 71 and 75 in the role-based framework 60. Logical operations performed by the server application 30 for deprecating and/or reducing the existing and derived management roles 71 and 75 will be described in greater detail below with respect to FIG. 7. From operation 415, the routine 400 then ends.

Figure 5:
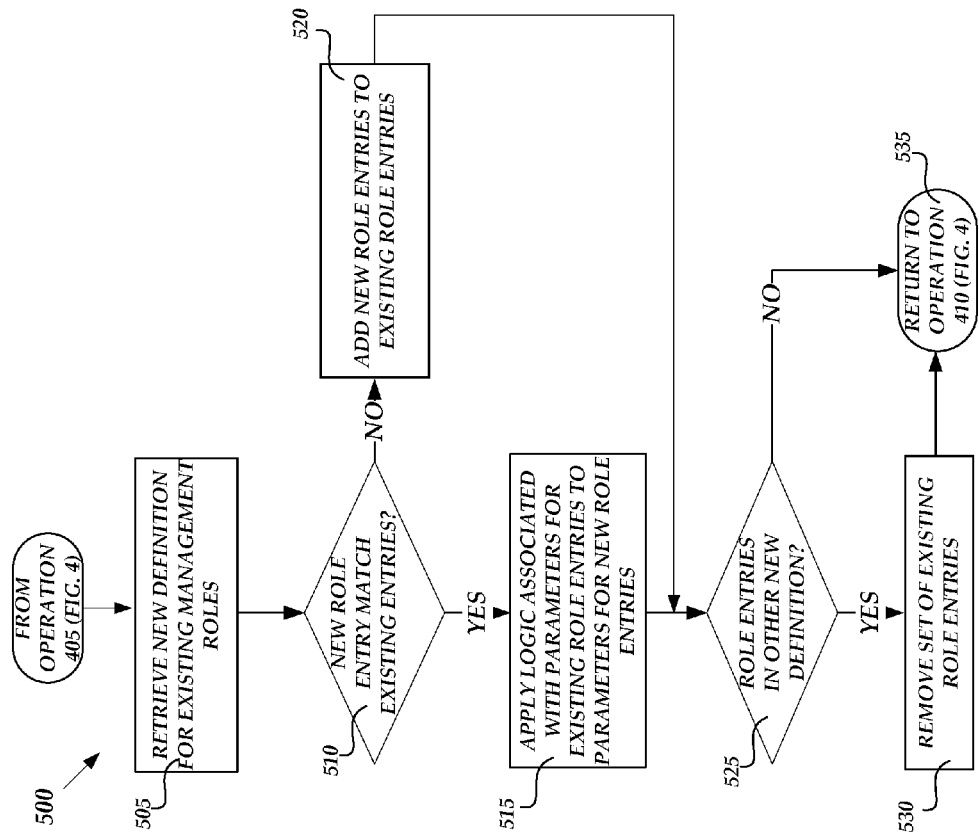
FIG. 5 is a flow diagram illustrating a routine for updating existing management roles, in accordance with various embodiments.

FIG. 5 is a flow diagram illustrating a routine 500 for updating existing management roles, in accordance with various embodiments. The routine 500 begins from operation 405 of FIG. 4 and continues at operation 505, where the server application 30 retrieves a new role definition 50 for the existing management roles 71. The retrieved new role definition 50 may include at least one new management role entry 83.

From operation 505, the routine 500 continues to operation 510 where the server application 30 executing on the server computer 70 determines if a new role entry (e.g., a new management role entry 83) matches any of a set comprising the existing management role entries 73. If, at operation 510, the server application 30 determines that a new role entry matches a role entry in a set comprising the existing management role entries 73, then the routine 500 continues to operation 515 where the server application 30 may apply logic associated with parameters (e.g., the parameters 92) for the set comprising the existing management role entries 73 to parameters for a new management role entry 83, in order to update an existing management role 71. From operation 515, the routine 500 branches to operation 525.

If, at operation 510, the server application 30 determines that a new role entry does not match a role entry in a set comprising the existing management role entries 73, then the routine 500 branches to operation 520 where the server application 30 adds new role entries (e.g., the new management role entries 83) to the set comprising the existing management role entries 73, in order to update an existing management role 71. From operation 520, the routine 500 continues to operation 525.

At operation 525, the server application 30 executing on the server computer 70 determines, from among the set comprising the existing management role entries 73, whether the set comprising the existing management role entries 73 exists in another new definition for an existing management role 71. In particular, for all existing role entries that are not in the new management role definition retrieved at operation 505, the server application 30 may be configured to check if the existing role entries exist in any new management role definitions. If, at operation 525, the server application 30 determines that existing role entries exist in another new management role definition, then the routine 500 continues to operation 530 where the server application 30 removes the existing role entries. In particular, when existing role entries exist in another new management role definition, the existing role entries may be removed from a current new definition because the actions defined in the existing role entries have been moved to another role. From operation 530, the routine 500 continues to operation 535 where the routine 500 then returns to operation 410 in FIG. 4.

If, at operation 525, the server application 30 determines that existing role entries do not exist in another new management role definition, then the server application 30 leaves the exiting role entries as is (i.e., the actions for the role entries were deprecated and thus the existing role entries are left for coexistence). From operation 525, the routine 500 branches to operation 525 where the routine 500 then returns to operation 410 in FIG. 4.

It should be understood that, in accordance with an embodiment, the routine 500 ensures that role entries can be removed from an affected role, without losing the permissions they grant. Furthermore, management roles with excessive rights may be patched as long as those rights are granted to a more appropriate management role. Moreover, the routine 500 ensures backwards and forward compatibility of the same role. Thus, role entries that are no longer available are preserved and new role entries are added, thereby allowing reuse of the same management role in different versions of the server application 30.

Figure 6:
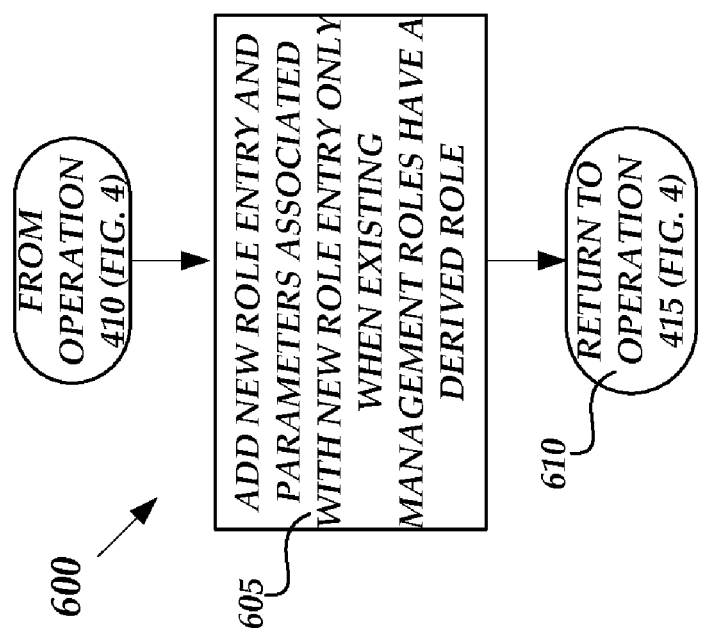
FIG. 6 is a flow diagram illustrating a routine for updating derived management roles, in accordance with various embodiments.

FIG. 6 is a flow diagram illustrating a routine 600 for updating derived management roles, in accordance with various embodiments. The routine 600 begins from operation 410 of FIG. 4 and continues at operation 605, where the server application 30 executing on the server computer 70 adds a new role entry, and parameters associated with the new role entry, only when existing management roles have a derived role. In particular, the server application 30 may update an existing derived role 75 in the role-based framework 60 by adding a new role entry 87 and parameters associated with the new role entry 87, only when an existing management role 71 has a derived role 75 within a group including an existing management role 71, a child of the existing management role 71, and an updated version of the existing management role 80 (i.e., a new management role 80). In accordance with an embodiment, the following table (below) describes how derived roles are updated. In the following table, "N+1 parent has it" identifies an updated or new management role which has a derived role, "N parent has it" identifies an existing management role which has a derived role, and "N child has it" identifies a child role of an existing management role (i.e., a top level role) which as a derived role.

| N + 1 parent has it | N parent has it | N child has it | Result |
|---|---|---|---|
| Y | Y | Y | 1. Old and new management roles have the role entry, ADD and look at parameters[1]. |
|  |  | N | 2. Role entry was intentionally removed in N, DO NOT ADD |
|  | N | Y | Impossible (child has something that parent does not) |
|  |  | N | 3. New role entry, ADD with all parameters |
| N | Y | Y | 4a. Obsolete role entry, DO NOT ADD |
|  |  | N | 4b. Obsolete role entry, DO NOT ADD |
|  | N | Y | Impossible (child has something that parent does not) |
|  |  | N | 5. Not an N or N + 1 role entry, DO NOT ADD (cannot get here) |

[1]Parameters must be evaluated using exactly the same handling table

From operation 605, the routine 600 continues to operation 610 where the routine 600 then returns to operation 415 in FIG. 4.

Figure 7:
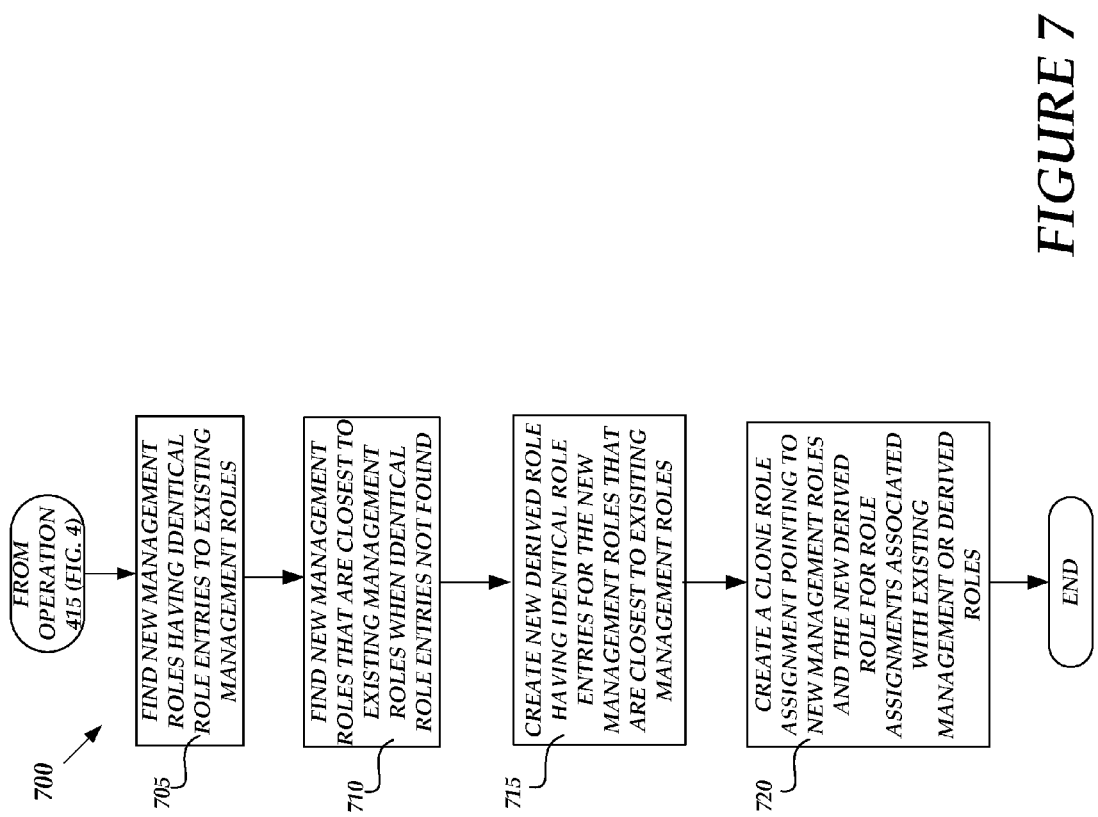
FIG. 7 is a flow diagram illustrating a routine for deprecating and/or reducing existing management roles and derived management roles, in accordance with various embodiments.

FIG. 7 is a flow diagram illustrating a routine 700 for deprecating and/or reducing existing management roles and derived management roles, in accordance with various embodiments. The routine 700 begins from operation 415 of FIG. 4 and continues at operation 705, where the server application 30 executing on the server computer 70 finds new management roles having identical role entries to existing management roles. For example, a new management role matches an existing (or old) management role if all of its role entries are present in the existing management (or old) role. The server application 30 may make the aforementioned comparison utilizing the rules in the table described above with respect to FIG. 6.

From operation 705, the routine 700 continues to operation 710 where the server application 30 executing on the server computer 70 finds new management roles that are closest to existing management roles when identical role entries can not be found. For example, when the server application 30 is unable to exactly match role entries between new and existing management roles, then the server application 30 finds the closest new management role to the existing management role.

From operation 710, the routine 700 continues to operation 715 where the server application 30 executing on the server computer 70 creates a new derived role having identical role entries for the new management roles that are closest to the existing management roles. For example, after the server application 30 finds the closest new management role to an existing management role at operation 710, the server application 30 may be configured to create a derived management role that exactly matches the existing management role.

From operation 715, the routine 700 continues to operation 720 where the server application 30 executing on the server computer 70 creates a clone role assignment pointing to new management and derived roles for role assignments associated with existing management or derived roles. For example, the server application 30 may be configured, for every single role assignment that is had by an existing (or old) management role or its derived roles, to create a clone role assignment that points to a new matches set of roles respecting the original scope of the existing roles. From operation 720, the routine 700 then ends.

It should be understood that, in accordance with an embodiment, the routine 700 of FIG. 7 ensures that permissions are not altered when a role is being deprecated or split. It may be appreciated that at certain times, there is a need to deprecate (delete) certain management roles or to reduce (i.e., split) them. In accordance with various embodiments, the routine 700 may be utilized for both of the aforementioned operations. It should further be understood that, in accordance with an embodiment, the definition of management roles described herein may allow for forward and backward compatibility. That is, a management role created in version X+1 of the server application 30 may be used in version X, as long as the permissions granted are available in the current version. Permissions that do not exist or which are not supported in a current executing version of the server application 30 may be removed and thus are not exposed to the user.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of upgrading at least one management role in a role-based framework, comprising:
    updating, by a computer, at least one existing management role, the at least one existing management role comprising a set of existing role entries, the set of existing role entries defining an action with at least one of parameters, scripts, application program interface calls, and a special permission for enabling performance of each of a plurality of tasks defined by the at least one existing management role;
    updating, by the computer, derived roles in the role-based framework, the derived roles comprising custom management roles derived from the at least one existing management role in the role-based framework, wherein updating the derived roles in the role-based framework comprises adding a new role entry and parameters associated with the new role entry only when the at least one existing management role has a derived role associated with the at least one existing management role, a child of the at least one management role, and an updated version of the at least one existing management role; and
    at least one of deleting and splitting, by the computer, the at least one existing management role and the derived roles in the role-based framework.

2. The method of claim 1, wherein updating at least one existing management role comprises:
    retrieving a new definition for the at least one existing management role, the new definition comprising at least one new role entry; and
    determining whether the at least one new role entry matches an entry in the set of existing management role entries.

3. The method of claim 2, wherein updating the at least one existing management role further comprises:
    if the at least one new role entry does not match an entry in the set of management role entries, then adding the at least one new role entry to the set of existing role entries to update the at least one existing management role; and
    if the at least one new role entry matches an entry in the set of existing role entries, then applying logic associated with the parameters for the set of existing role entries to parameters for the at least one new role entry to update the at least one existing management role.

4. The method of claim 3, wherein updating the at least one existing management role further comprises:
    determining, from among the set of existing role entries that are not in the new definition for the at least one existing management role, whether the set of existing role entries exists in at least one other new definition for the at least one existing management role; and if the set of existing role entries exists in at least one other new definition for the at least one management role, then removing the set of existing role entries to update the at least one existing management role.

5. The method of claim 4, wherein updating the at least one existing management role further comprises ensuring backwards and forward compatibility of the at least one existing management role and a new management role comprising an update of the at least one existing management role.

6. The method of claim 1, wherein at least one of deprecating and reducing the at least one existing management role and the derived role in the role-based framework comprises:

finding, from a set comprising at least one new management role, a new management role having identical role entries to the at least one existing management role, the at least one new management role comprising an updated version of the at least one existing management role;

finding at least one new management role that is closest to the at least one existing management role when the new management role having identical role entries to the at least one existing management role is not found;

creating, from the at least one management role that is closest to the at least one existing management role, a new derived role having identical role entries to the at least one existing management role; and creating, for role assignments associated with the at least one existing management role or associated with derived roles from the at least one existing management role, a clone role assignment pointing to at least the new management role and the new derived role.

7. A computer-readable storage medium, wherein the computer readable storage medium does not consist of a propagated data signal, the computer-readable storage medium comprising computer-executable instructions which, when executed by a computer, will cause the computer to perform a method of upgrading at least one management role in a role-based framework, comprising:

updating at least one existing management role, the at least one existing management role comprising a set of existing role entries, the set of existing role entries defining an action with at least one of parameters, scripts, application program interface calls, and a special permission for enabling performance of each of a plurality of tasks defined by the at least one existing management role;

updating derived roles in the role-based framework, the derived roles comprising custom management roles derived from the at least one existing management role in the role-based framework, wherein updating the derived roles in the role-based framework comprises adding a new role entry and parameters associated with the new role entry only when the at least one existing management role has a derived role associated with the at least one existing management role, a child of the at least one management role, and an updated version of the at least one existing management role; and at least one of deleting and splitting the at least one existing management role and the derived roles in the role-based framework.

8. The computer-readable storage medium of claim 7, wherein updating at least one existing management role comprises:

retrieving a new definition for the at least one existing management role, the new definition comprising at least one new role entry; and determining whether the at least one new role entry matches an entry in the set of existing management role entries.

9. The computer-readable storage medium of claim 8, wherein updating the at least one existing management role further comprises:

if the at least one new role entry does not match an entry in the set of management role entries, then adding the at least one new role entry to the set of existing role entries to update the at least one existing management role; and if the at least one new role entry matches an entry in the set of existing role entries, then applying logic associated with the parameters for the set of existing role entries to parameters for the at least one new role entry to update the at least one existing management role.

10. The computer-readable storage medium of claim 9, wherein updating the at least one existing management role further comprises:

determining, from among the set of existing role entries that are not in the new definition for the at least one existing management role, whether the set of existing role entries exists in at least one other new definition for the at least one existing management role; and if the set of existing role entries exists in at least one other new definition for the at least one management role, then removing the set of existing role entries to update the at least one existing management role.

11. The computer-readable storage medium of claim 10, wherein updating the at least one existing management role further comprises ensuring backwards and forward compatibility of the at least one existing management role and a new management role comprising an update of the at least one existing management role.

12. The computer-readable storage medium of claim 7, wherein at least one of deprecating and reducing the at least one existing management role and the derived role roles in the role-based framework comprises:

finding, from a set comprising at least one new management role, a new management role having identical role entries to the at least one existing management role, the at least one new management role comprising an updated version of the at least one existing management role;

finding at least one new management role that is closest to the at least one existing management role when the new management role having identical role entries to the at least one existing management role is not found;

creating, from the at least one management role that is closest to the at least one existing management role, a new derived role having identical role entries to the at least one existing management role; and creating, for role assignments associated with the at least one existing management role or associated with derived roles from the at least one existing management role, a clone role assignment pointing to at least the new management role and the new derived role.

13. A computer-implemented method of upgrading at least one management role in a role-based framework, comprising:

updating, by a computer, at least one existing top level management role, the at least one existing top level management role comprising a set of existing role entries, the set of existing role entries defining an action with at least one of specific parameters, scripts, application program interface calls, and a special permission for enabling performance of each of a plurality of tasks defined by the at least one existing top level management role, the at least one existing top level management role comprising a canned management role in the role-based framework;

updating, by the computer, derived roles in the role-based framework, the derived roles comprising custom management roles derived from the at least one existing top level management role in the role-based framework, wherein updating the derived roles in the role-based framework comprises adding a new role entry and parameters associated with the new role entry only when the at least one existing top level management role has a derived role associated with the at least one existing management role, a child of the at least one management role, and an updated version of the at least one existing management role; and at least one of deleting and splitting, by the computer, the at least one existing top level management role and the derived roles in the role-based framework.

14. The method of claim 13, wherein updating at least one existing top level management role comprises:

retrieving a new definition for the at least one existing top level management role, the new definition comprising at least one new role entry;

determining whether the at least one new role entry matches an entry in the set of existing management role entries;

if the at least one new role entry does not match an entry in the set of management role entries, then adding the at least one new role entry to the set of existing role entries to update the at least one existing top level management role; and if the at least one new role entry matches an entry in the set of existing role entries, then applying logic associated with the parameters for the set of existing role entries to parameters for the at least one new role entry to update the at least one existing top level management role.

15. The method of claim 14, wherein updating the at least one existing top level management role further comprises:

determining, from among the set of existing role entries that are not in the new definition for the at least one existing top level management role, whether the set of existing role entries exists in at least one other new definition for the at least one existing top level management role; and if the set of existing role entries exists in at least one other new definition for the at least one top level management role, then removing the set of existing role entries to update the at least one existing top level management role.

16. The method of claim 15, wherein updating the at least one existing top level management role further comprises ensuring backwards and forward compatibility between the existing top level management role and a new top level management role comprising an update of the at least one existing top level management role.

17. The method of claim 13, wherein at least one of deprecating and reducing the at least one existing top level management role and the derived role roles in the role-based framework comprises:

finding, from a set comprising at least one new management role, a new management role having identical role entries to the at least one existing top level management role, the at least one new management role comprising an updated version of the at least one existing top level management role;

finding at least one new management role that is closest to the at least one existing top level management role when the new management role having identical role entries to the at least one existing top level management role is not found;

creating, from the at least one management role that is closest to the at least one existing top level management role, a new derived role having identical role entries to the at least one existing top level management role; and creating, for role assignments associated with the at least one existing top level management role or associated with derived roles from the at least one existing top level management role, a clone role assignment pointing to at least the new management role and the new derived role.

* * * * *